United States Patent [19]
Lundqvist

[11] 3,806,758

[45] Apr. 23, 1974

[54] DYNAMIC FOCUS GENERATOR

[75] Inventor: Sven G. Lundqvist, Carlsbad, Calif.

[73] Assignee: Hughes Aircraft Company, Culver City, Calif.

[22] Filed: July 19, 1972

[21] Appl. No.: 273,084

[52] U.S. Cl. .............................................. 315/31 R
[51] Int. Cl. .............................................. H01j 29/70
[58] Field of Search ......... 315/27 GD, 27 TD, 27 R, 315/31 R, 30 R

[56] References Cited

UNITED STATES PATENTS 3,422,305 1/1969 Infante .............................. 315/31 R
3,496,408 2/1970 Kirkham .............................. 315/31 R

*Primary Examiner*—Maynard R. Wilbur
*Assistant Examiner*—J. M. Potenza
*Attorney, Agent, or Firm*—W. H. MacAllister, Jr.; Robert H. Himes; Fay I. Konzem

[57] ABSTRACT

This invention relates to apparatus for converting X and Y cathode ray type tube deflection signals into a $(X^2 + Y^2)$ function voltage needed for dynamic focusing of the cathode ray tube beam. This $(X^2 + Y^2)$ function voltage is provided by utilizing the square law characteristics of field effect transistors in conjunction with proper mixing and amplification.

4 Claims, 3 Drawing Figures

DYNAMIC FOCUS GENERATOR

BACKGROUND OF THE INVENTION

One contemporary form of dynamic focusing apparatus implemented a straight-forward integration of the ramp function voltages used for deflection signals. This apparatus is only applicable to systems having fixed raster deflection rates and is not applicable in the general case where random or variable deflection is used such as in the case of graphics writing. The general case requires a true DC coupled squaring-adding device. Early approaches implemented the squaring-adding function by the brute force method of shaping the deflection sawtooth with a biased diode array. This diode array required, in addition to amplitude and symmetry controls, bias adjustments for each diode.

SUMMARY OF THE INVENTION

Implementation of the dynamic focus generator of the present invention is achieved by exploiting the square law relationship between the drain current and the gate-to-source voltage of a field effect transistor. The output signal of such a field effect transistor consists of the desired square of the input signal together with a component which is a linear function of the input signal. By adding an appropriate amount of the input signal to the output signal, the desired square function is obtained. Advantages of a dynamic focus generator of this type are that the various stages may be DC coupled with concomitant wide bandwidth making the device useful for random deflection. In addition, the dynamic focus generator of the invention has generally fewer components than contemporary systems along with greater temperature stability, since drift in the amplifying stage is essentially compensated for by drift in the field effect transistor stage. Lastly, the generator has sufficient tolerance to field effect transistor characteristic variations as to not require matching.

DESCRIPTION

Figure 1:
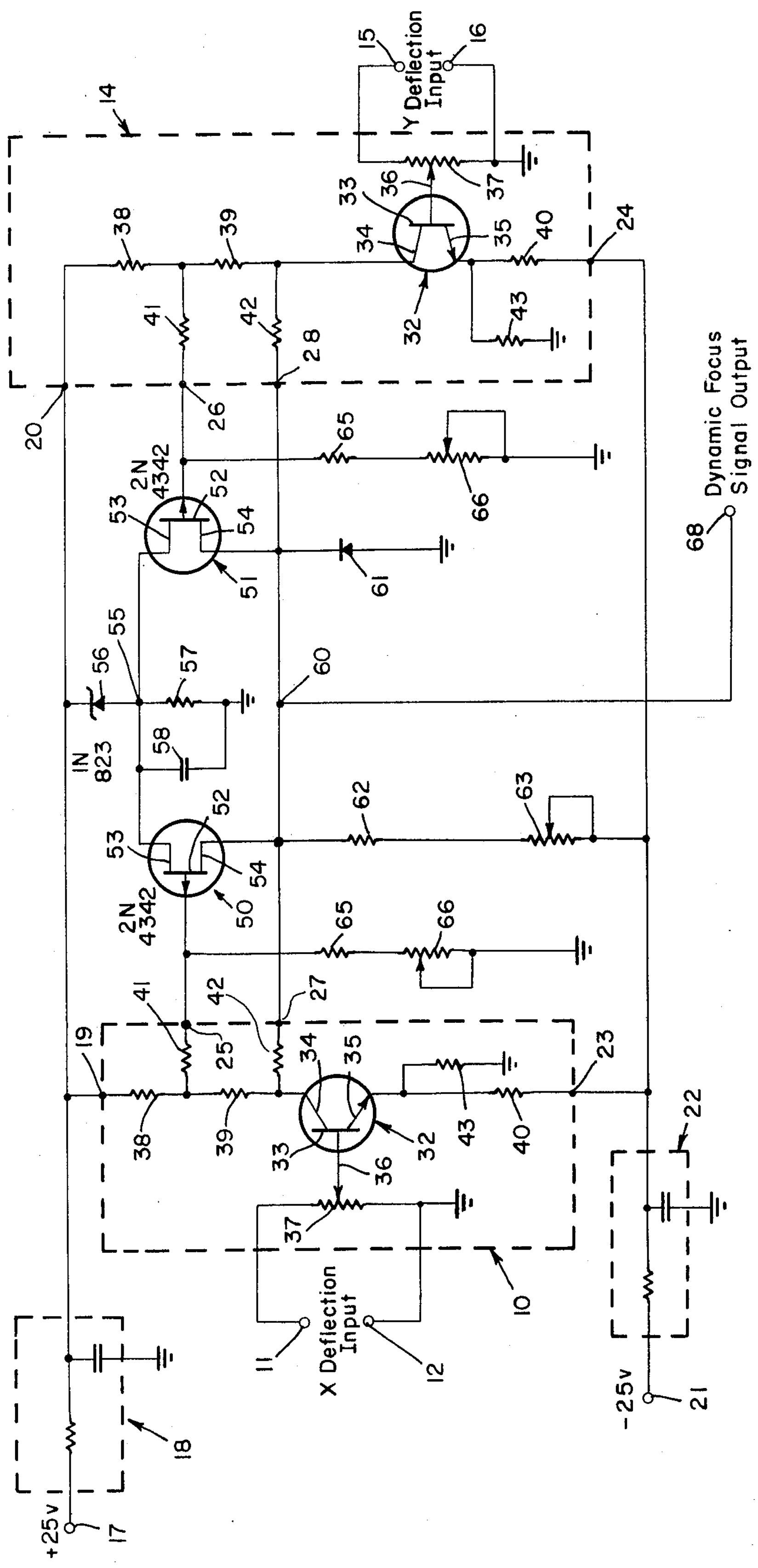
FIG. 1 illustrates a schematic circuit diagram of a preferred embodiment of the dynamic focus generator of the present invention.

Referring to FIG. 1 of the drawings wherein like reference numerals designate like elements there is shown a schematic circuit diagram of the dynamic focus generator of the present invention. More particularly, the generator includes an X-deflection amplifier 10 adapted to receive X-deflection input signals from input terminals 11, 12 the latter of which is referenced to ground and a symmetrical Y-deflection amplifier 14 adapted to receive Y-deflection input signals from input terminals 15,16 the latter of which is also referenced to ground. A positive 25 volts is applied to a terminal 17 which is connected through a smoothing circuit 18 to input terminals 19,20 of amplifiers 10,14 respectively. Similarly, a negative 25 volts is applied to a terminal 21 which is connected through a smoothing circuit 22 to input terminals 23,24 of amplifiers 10,14, respectively. Amplifiers 10,14, provide low-level output terminals 25,26 and high-level output terminals 27,28. The term "high-level" is used to designate that the gain of the signals applied to base 33 of transistors 32 is greater at the "high-level" output terminals 27,28 than at the "low-level" output terminals 25,26. In the particular embodiment described, the gain at high-level output terminals 27,28 is approximately five times that at the low-level output terminals 25,26.

Amplifier 10 includes a transistor 32 which may be of the type designated 2N2222 having a base 33 a collector 34 and an emitter 35. The base 33 of transistor 32 is connected to the adjustable contact 36 of a potentiometer 37 which is connected between X-deflection input terminals 11,12. Potentiometer 37 has a resistance of the order of 100 ohms. Next, resistors 38,39 are serially connected in the order named from terminal 19 to the collector 34 of transistor 32 and the emitter 35 thereof connected through a resistor 40 to the terminal 23. Resistors 38,39 and 40 have resistances of the order of 330, 2,200 and 3,000 ohms, respectively. Lastly, the junction between resistors 38,39 is connected through a resistor 41 to low-level output terminal 25; the collector 34 of transistor 32 is connected through a resistor 42 to high-level output terminal 27; and the emitter 35 is connected through a resistor 43 to ground. Resistors 41,42 and 43 have resistances of the order of 8,200, 6,800 and 220 ohms, respectively. The amplifier 14 is the same as the above-described amplifier 10. The resistance of resistor 43 is used to set the gain of amplifiers 10,14.

In addition to the amplifiers 10,14, the dynamic focus generator includes field effect transistors 50,51 each of which has a gate 52, a source 53 and a drain 54. The field effect transistors may be of a type designated 2N4342. The sources 53 of field effect transistors 50,51 are connected to a common junction 55 which, in turn, is connected through a zener diode 56 to the output of smoothing circuit 18 and in parallel through a resistor 57 and a capacitor 58 to ground. The zener diode 56 may be of a type designated 1N823, the resistor 57 has a resistance of 4,700 ohms and the capacitor 58 has a capacitance of 0.1 microfarads. The gates 52 of field effect transistors 50,51 are connected to the low-level output terminals 25,26, respectively, of amplifiers 10,14 and the drains 54 are connected to a common junction 60 which, in turn, is connected to both high-level output terminals 27,28 of amplifiers 10,14. Common junction 60 is connected to ground through a diode 61 so that only positive voltage excursions can appear thereon and, in addition, is connected in series through a resistor 62 and a rheostat 63 to the output terminal of the smoothing circuit 22. The resistor 62 has a resistance of the order of 5,100 ohms and the rheostat 63 has a maximum direct current resistance of 5,000 ohms. The diode 61 is for circuit protection purposes and is not needed for the dynamic focusing function. In addition to the above, each gate 52 of field effect transistors 50,51 is connected serially through a resistor 65 and a rheostat 66 to ground. The resistors 65 have a resistance of the order of 39,000 ohms and the rheostats 66 a maximum resistance of the order of 50,000 ohms. The purpose of the rheostats 66 is to control symmetry as will hereinafter be explained. Lastly, a connection from common junction 60 to an output terminal 68 provides a dynamic focus output signal.

The operation of the dynamic focus generator of the present invention is based upon the square law relationship between the drain current and the gate-to-source voltage of the field effect transistors 50,51. Namely:

$$I_D = I_{DSS}\ (1 - V_{GS}/V_P)^2 \qquad (1)$$

where $I_D$ = drain current of field effect transistor 50 or 51

$I_{DSS}$ = drain current with zero gate-source bias
$V_{GS}$ = gate-source bias
$V_P$ = pinch-off gate-source voltage Although the square law relationship is theoretical, most contemporary field effect transistors approximate it very closely. In any event, the error is insignificant in the present case. Expanding Equation (1)

$$I_D = I_{DSS}/V_P^2\ (V_P^2 - 2V_{GS}\ V_P + V_{GS}^2) \qquad (2)$$

Since $I_{DSS}$ and $V_P$ are constants for a given field effect transistor, the output signal consists of the desired square of the input signal and a component which is a linear function of the input signal $V_{GS}$. By adding an appropriate portion of the input signal to the output signal, the desired function is obtained. Note that the dynamic focus generator is essentially symmetriacal in order to handle both X and Y deflection signals.

Figure 2:
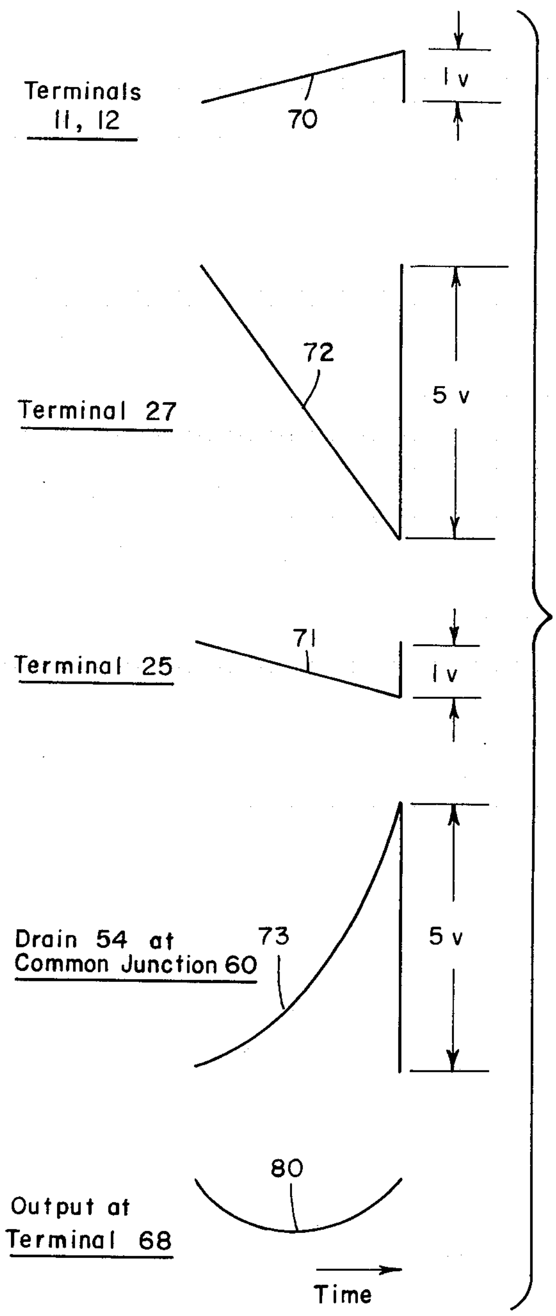
FIG. 2 shows voltage waveforms at various points in the apparatus of FIG. 1.

Considering at first only the amplifier 10 and the associated field effect transistor 50 and assume a 1 volt peak-to-peak sawtooth input signal at terminals 11,12 designated as voltage characteristic 70, FIG. 2. Amplifier 10 provides two output signals, a smaller signal across the resistor 38 at terminal 25 designated as voltage characteristic 71, FIG. 2 and a larger signal across the resistors 38 and 39 at terminal 27 designated as voltage characteristic 72, FIG. 2. The larger signal actually appearing at the collector 34 of transistor 32 is approximately 10 times the amplitude of the input signal and is connected to terminal 27 through an approximate 2:1 voltage divider formed by resistor 42 and the serial combination of resistor 62 and rheostat 63. This approximately 5 volts peak-to-peak inverted sawtooth signal 72 is contributed to the output by this circuit.

The smaller signal 71 is derived across resistor 38 which has a resistance of the order of 330 ohms and applied to the gate 52 of field effect transistor 50 through a biasing divider composed of resistors 41,65 and rheostat 66 with little loss of signal amplitude. As shown in FIG. 2, the signal 71 amplitude at gate 52 is approximately 1 volt peak-to-peak. The source 53 of field effect transistor 50 is at a stable DC potential by virtue of the fixed drop across zener diode 56, so the output signal designated as voltage characteristic 73, FIG. 2 is a function only of the gate signal 71 and its bias level as described in connection with FIG. 3.

Figure 3:
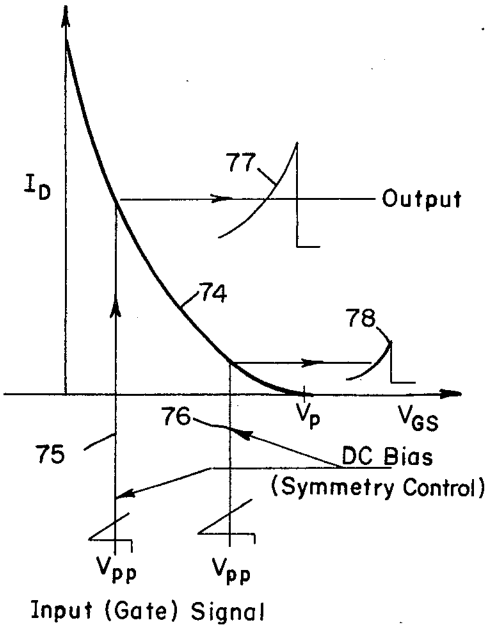
FIG. 3 illustrates the direct current bias points of the field effect transistors in the apparatus of FIG. 1.

Referring to FIG. 3 there is shown the transfer characteristic 74 of field effect transistor 50 illustrating $I_D$ versus $V_{GS}$ where, as before $I_D$ is the drain current, $V_{GS}$ the gate-source bias, $V_P$ the pinch-off gate-source voltage and $V_{PP}$ the peak-to-peak signal at the input gate 52. The DC bias points such as, for example, 75,76 are selected by adjustment of the rheostat 66. The DC bias point 75 results in a higher amplitude signal 77 than the signal 78 which corresponds to DC bias point 76. DC bias points intermediate points 75,76 result in signal amplitudes intermediate those of signals 77,78. In the operation of the dynamic focus generator of the present invention, the signal 72, FIG. 2 contributed to the output of the device by amplifier 10 is added to the signal 73 developed at drain 54 of field effect transistor 50 to form the output signal 80. The function of diode 61 connected from the output junction to ground prevents negative excursions of the output signal when desired for circuit protection purposes. The system is initially adjusted by independently applying a ramp voltage 70 that extends for the entire X or Y deflection range. The amplitude of voltage characteristic 73 is then adjusted by means of rheostat 66 to make the output voltage characteristic 80 for the respective X and Y deflection signals symmetrical. This is achieved by making the peak output signal 73 of field effect transistors 50,50 substantially equal in magnitude to that of the peak of the high-level output signals 72 at terminals 27,28 as illustrated in FIG. 2. The rheostat 63 is adjusted to set the DC level of the output signal. As evident from FIG. 1 of the drawings, the Y-deflection side is identical to previously described X-deflection side and operates in the same manner with all of the output signals being summed at the output junction 60.

Once the dynamic focus generator has been adjusted by independent application of appropriate ramp voltage signals 70 at the respective X-Deflection Input 11,12 and Y-Deflection Input 15,16, the generator responds with a focusing signal for any arbitrary deflection voltage at either input for any deflection. This is possible since the dynamic focusing signal is not the product of the charging or discharging of any capacitance. Lastly, since the individual functions follow the square law, the sum of the two X and Y functions represents the square of the hypotenuse of the individual X and Y deflections and hence represents the appropriate dynamic focusing signal for the combined X and Y deflection.

What is claimed is:

1. In a dynamic focusing generator for generating a dynamic focusing signal for a cathode ray type tube having a deflection signal, said generator comprising means responsive to said deflection signal for providing first and second inverted deflection signals, said second inverted deflection signal having a selected peak amplitude corresponding to maximum deflection; a field effect transistor having source, gate and drain connections, said gate connection being responsive to said first inverted deflection signal for producing a non-inverted output signal at said drain connection thereof having a peak amplitude corresponding to maximum deflection substantially equal in magnitude to said selected peak amplitude; means connected to said source connection of said field effect transistor for maintaining said source connection at a fixed direct-current potential level; and means responsive to said second inverted deflection signal and said non-inverted output signal appearing at said drain connection of said field effect transistor for combining said signals thereby to produce a composite signal equal to the difference thereof thereby to provide said dynamic focusing signal corresponding to said deflection signal for said cathode ray type tube.

2. A dynamic focusing generator for a cathode ray type tube having X and Y deflection signals, said generator comprising first and second amplifiers responsive to said X and Y deflection signals, respectively, for providing inverted X and Y deflection signals of first and second selected amplitudes corresponding to maximum X and Y deflection, respectively, and additional inverted X and Y deflection signals; first and second field effect transistors each having a source, a gate and a drain connection, said gate connections of said first and second field effect transistors being responsive to said additional inverted X and Y deflection signals, respectively; means for adjusting the peak amplitudes of the output signals from said first and second field effect transistors to be substantially equal to said first and second selected amplitudes when at maximum X and Y deflections, respectively; and means responsive to said inverted X and Y deflection signals and said output signals from said first and second field effect transistors for producing a composite signal equal to the difference thereof thereby to provide a dynamic focusing signal for said cathode ray type tube.

3. The dynamic focusing generator for a cathode ray type tube having X and Y deflection signals as defined in claim 2 wherein said first selected amplitude is equal to said second selected amplitude.

4. The dynamic focusing generator for a cathode ray type tube having X and Y deflection signals as defined in claim 2 additionally including means connected to said source connections of said first and second field effect transistors for maintaining said source connections at a fixed direct-current potential level.

* * * * *